United States Patent
Tessitore

(10) Patent No.: US 6,345,702 B1
(45) Date of Patent: Feb. 12, 2002

(54) BRAKE ADJUSTERS

(75) Inventor: Luigi Tessitore, Savona (IT)

(73) Assignee: Automotive Products (Italia) SpA, Savona (IT)

( * ) Notice: Subject to any disclaimer, the term of this patent is extended or adjusted under 35 U.S.C. 154(b) by 0 days.

(21) Appl. No.: 09/253,959

(22) Filed: Feb. 22, 1999

(30) Foreign Application Priority Data

Feb. 19, 1998 (GB) .............................................. 9893598

(51) Int. Cl.[7] .............................................. F16D 51/00
(52) U.S. Cl. .............................. 188/79.52; 188/79.54; 188/196 BA; 188/79.51
(58) Field of Search .......................... 188/79.51, 79.52, 188/79.54, 79.56, 71.7, 196 BA, 196 B

(56) References Cited

U.S. PATENT DOCUMENTS

| | | | | |
|---|---|---|---|---|
| 4,250,980 A | * | 2/1981 | Kluger ..................... | 188/79.54 |
| 4,385,681 A | * | 5/1983 | Conrad et al. ........... | 188/79.52 |
| 4,706,783 A | * | 11/1987 | Rath et al. ............... | 188/79.52 |
| 4,706,784 A | | 11/1987 | Shellhause ............... | 188/79.52 |
| 4,729,457 A | | 3/1988 | Cousin et al. ........... | 188/79.52 |

FOREIGN PATENT DOCUMENTS

| | | | | |
|---|---|---|---|---|
| DE | 575825 A1 | * 12/1993 | ............. | 188/79.52 |
| EP | 0538909 | 4/1993 | | |
| GB | 1033607 | 6/1966 | | |
| GB | 1513740 | 6/1978 | | |
| GB | 2246825 | * 12/1992 | ............. | 188/79.54 |
| JP | 53-76262 | * 7/1978 | ............. | 188/79.52 |

* cited by examiner

Primary Examiner—Robert J. Oberleitner
Assistant Examiner—Mariano Sy
(74) Attorney, Agent, or Firm—Paul E Milliken; Ray L Weber

(57) ABSTRACT

A brake adjuster comprises a variable length strut (16) having two end portions (30, 31) and an intermediate portion (32) therebetween which is in screw threaded engagement with one of the end portions (31). A pawl (39) is attached to the other end portion (30) and engages an array of ratchet teeth (38) the intermediate portion (32). As the end portions of the strut (30, 31) move apart during a brake application the pawl (39) rides up a flank of a ratchet tooth (38a) and if the movement apart exceeds a predetermined amount engages behind the tooth (38a). When the end portions (30, 31) move towards each other in the next brake disengagement, the intermediate portion (32) is rotated relative to said one of the end portions (31) to increase the effective length of the strut (16). The pawl (39) may be bi-metallic and arranged to disengage the ratchet teeth (38) if the temperature of the adjuster rises above a predetermined level.

8 Claims, 3 Drawing Sheets

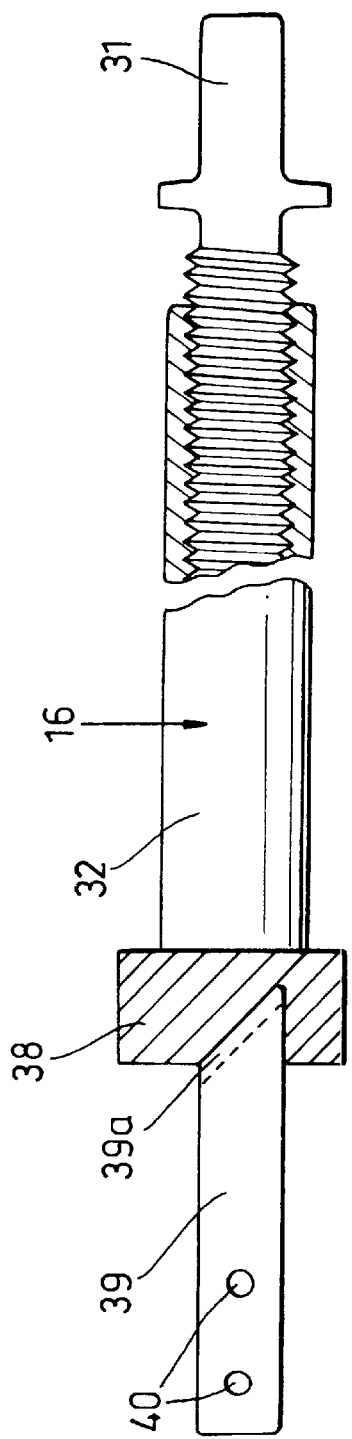
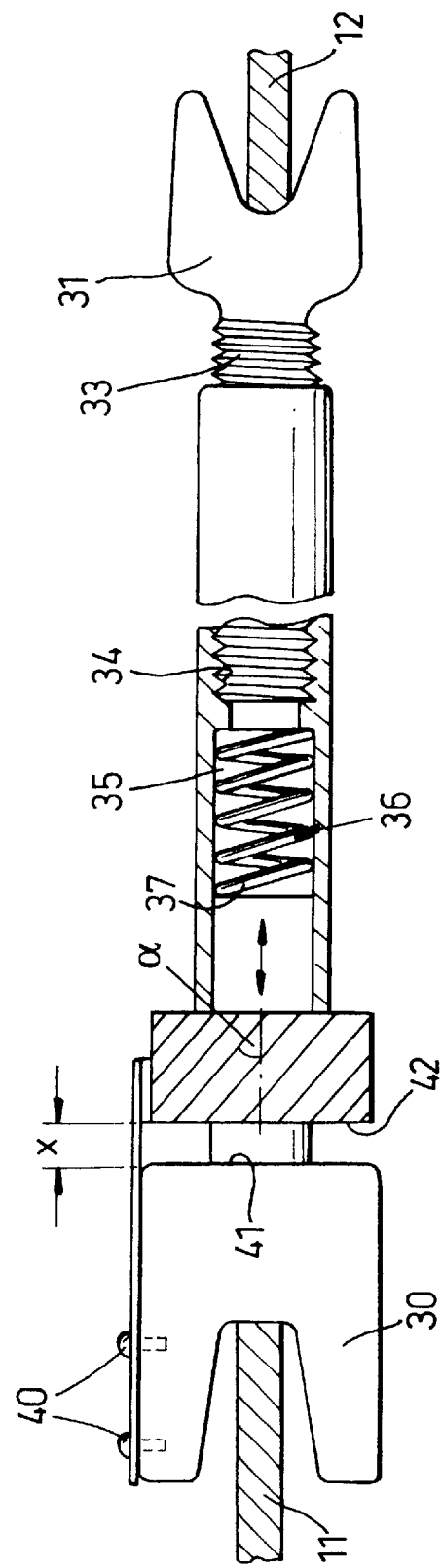

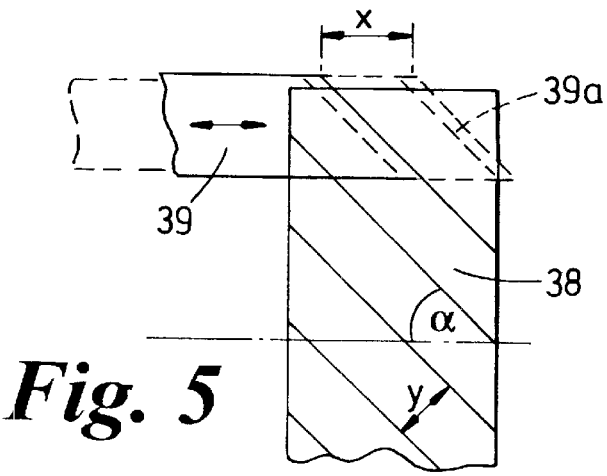
*Fig. 5*
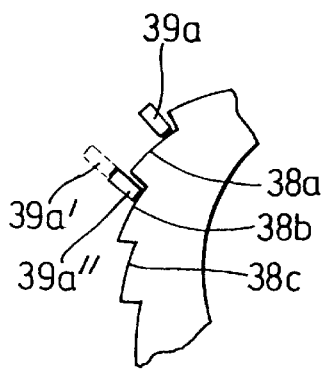
*Fig. 6*
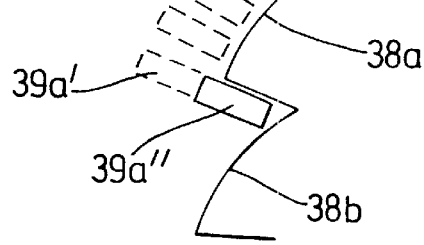
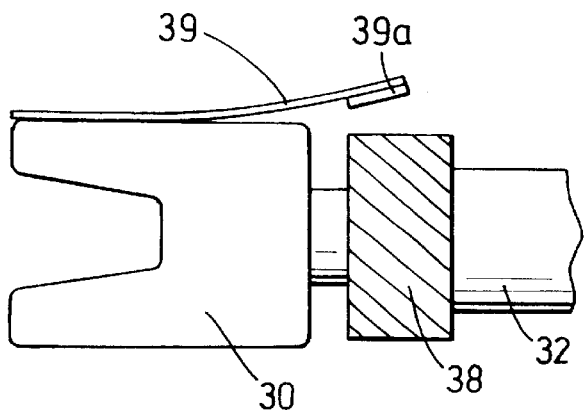
*Fig. 7*

BRAKE ADJUSTERS

This invention relates to brake adjusters and in particular to brake adjusters for use with drum brakes.

Such adjusters are used to maintain drum brake shoe travel substantially constant as the drum brake shoes wear.

Typically such adjusters comprise a strut which extends between the shoes of the drum brake, or between one shoe and a handbrake operating lever associated with the other shoe, the strut being arranged to increase in effective length as the shoes wear in order to advance the shoes towards the associated drum thus maintaining shoe travel substantially constant.

One problem with such adjusters is the provision of a simple, cheap and effective design which is also capable of incorporation of a temperature sensitive feature which ensures that the adjuster will not operate at brake temperatures above a predetermined level to prevent the common phenomenon of over adjustment due to brake drum expansion at higher temperatures.

It is an object of the present invention to provide a brake adjuster for a drum brake which mitigates the above problems.

Thus according to the present invention there is provided a brake adjuster for a drum brake arranged to be located either between a pair of brake shoes or between a brake shoe and a handbrake lever associated with the other shoe, the adjuster comprising a variable length strut having two end portions and an intermediate portion therebetween in screw threaded engagement with one of the end portions to vary the effective length of the strut, the other end portion being connected with the intermediate portion via a pawl and ratchet device comprising ratchet teeth on one portion and a pawl on the other portion, the pawl and ratchet device being arranged so that as the end portions of the strut move apart during a brake application (or alternatively on a brake disengagement) the pawl rides up a ratchet tooth and if the movement apart exceeds a predetermined amount engages behind said tooth, so that when the end portions move towards each other in the next brake disengagement (or alternatively on the next brake application) the intermediate portion is rotated relative to said one of the end portions to increase the effective length of the strut and hence reduce the travel apart of the end portions on the next brake application.

Preferably the pawl is bi-metallic and disengages the ratchet teeth if the temperature of the adjuster rises above a predetermined level to prevent adjustment of the effective length of the strut.

Typically the bi-metallic pawl disengages the ratchet teeth when the bi-metallic pawl reaches approximately 80° C. which represents a drum temperature of approximately 180° C.

Preferably the said one end portion is in screw threaded engagement with a first axial end of the intermediate portion and the said other end portion is in sliding engagement with the other axial end of the intermediate portion.

Preferably the other end portion extends into a bore in the intermediate portion which houses a spring which biases the end portions apart and maintains the end portions in contact with the associated shoes or lever. The end portions may be forked for easy engagement with the shoes or lever.

The ratchet teeth may extend circumferentially around the intermediate member with the pitch and angle of the teeth determining the shoe travel before adjustment takes place.

Typically the teeth will have a pitch of 1.25 mm which gives a travel of 1.00 mm before adjustment takes place.

One embodiment of the present invention will now be described, by way of example only, with reference to the accompanying drawings in which:

FIGS. 3 and 4 show side and plan views respectively of the adjuster used in FIG. 1;

FIGS. 5 and 6 show details on a larger scale of the adjuster of FIGS. 3 and 4, and FIG. 7 shows a part view, similar to FIG. 4 showing the adjuster deactivated by operation of a bi-metallic pawl.

Figure 1:
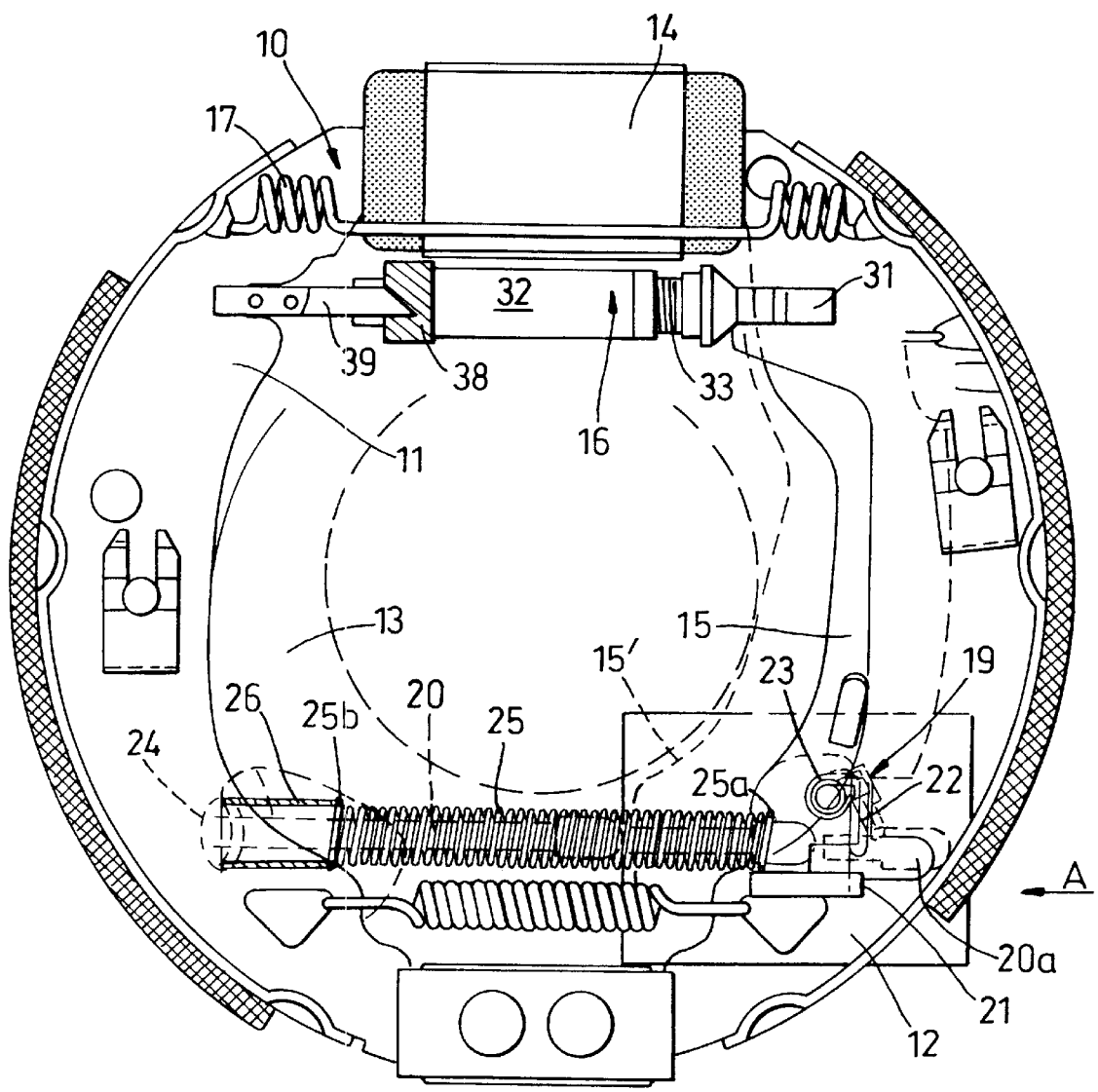
FIG. 1 shows a drum brake which includes a brake adjuster in accordance with the present invention.
Figure 2:
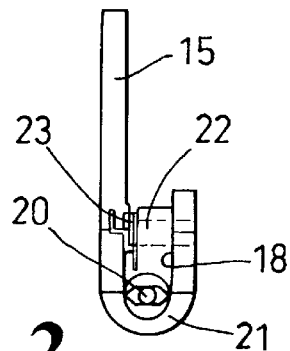
FIG. 2 shows a view in the direction of arrow A of FIG. 1.

Referring to FIG. 1 this shows a drum brake assembly 10 in which two brake shoes 11 and 12 are mounted on a backplate 13 for service application by an hydraulic cylinder 14 in the known manner. A parking brake function is provided in which pivoting of a parking lever 15 from the full line position shown in FIG. 1 to the dotted position 15' applies both shoes to the brake drum via a strut 16. Strut 16 is held against shoes 11 and 12 at all times by a pull-off spring 17. A parking brake cable 20 is connected with lever 15 via a quick-attach latching device 19 of the form described in the Applicant's co-pending UK patent application No. GB 9705206.2 in which a pivoting flap 22 biased by a coil spring 23 latches an end fitting 20a on the cable to an edge 21 of a U-shaped section channel 18 of lever 15. Backplate 13 is provided with an aperture 24 through which the actuating cable 20 is fed and a guide means in the form of a compression spring 25 extends between the aperture 24 and the end of the channel 18 in lever 15. The end 25a of spring 25 is received as a direct friction grip in the U-shaped channel 18 whilst the end 25b is connected with a short rigid tubular guide 26 which is supported in aperture 24. Compression spring 25 also loads lever 15 to tend to return the lever to the non-operative full line position shown in FIG. 1 when the handbrake function is released. Further details of latching device 19 and manner in which the cable end fitting 20a is automatically latched to lever 15 can be obtained, if required, from the previously referred to earlier UK application No GB 9705206.2.

Alternatively the cable may be secured to lever 15 by a simple pin or other attachment means.

In accordance with the present invention the strut 16 has two forked end portions 30 and 31 which directly engage brake shoes 11 and 12 respectively and an intermediate portion 32 which is connected with both end portions. Forked end portion 31 is connected with intermediate portion 32 via screw threaded portion 33 which engages an internal screw threaded bore 34 in the intermediate member. End portion 30 slides in a bore 35 in the other end of intermediate member 32 in which a compression spring 36 is housed which acts against the end 37 of end portion 30. Intermediate portion 32 carries ratchet teeth 38 which are engaged by a bi-metallic pawl 39 which is riveted to end portion 30 at 40.

The ratchet teeth 38 are inclined at an angle α (typically 40°) to the longitudinal axis of the strut 16 and have a flank width y. Bi-metallic pawl 39 has a tooth portion 39a which extends generally parallel to the flank angle α of the ratchet teeth 38. Tooth portion 39a could be a separate component secured (e.g. riveted) to pawl 39. There is an axial clearance x between a shoulder 41 on end portion 30 and the edge 42 of ratchet teeth 38. This axial clearance x together with the details of pawl 39 and ratchet teeth 38 determines the amount of shoe travel necessary before the brake adjuster built into strut 16 operates to effect an adjustment in the effective length of the strut 16 as will be evident from the following description of the operation of the device.

Spring 36 ensures that the forked end portions 30 and 31 remain in contact with their respective brake shoes 11 and 12 at all times. When the brake is applied by wheel cylinder 14 end portion 30 moves to the left (as viewed in FIG. 1) relative to the intermediate portion 32 and other end portion 31 and as a result of this movement the pawl tooth 39a moves across the tooth flank 38a (see FIGS. 5 and 6) with which the pawl is currently in contact. Eventually, after sufficient brake shoe wear, during a given brake application the axial movement of end portion 30 relative to intermediate portion 32 establishes an axial clearance x which is sufficiently large to cause the pawl tooth 39a to reach the position 39a' where it snaps over the edge of the currently engaged tooth flank 38a to the position 39a" where it is engaged with the next toothed flank 38b behind the previously engaged tooth. During the subsequent retraction of the brake shoes when the brake is next released, the axial clearance x is taken up and engagement of tooth 39a in the 39a" position causes anticlockwise rotation of the intermediate member 32 when viewed from the left hand end thus increasing the effective length of the strut 16 via the screw-thread engagement of end portion 31 and intermediate portion 32.

During subsequent brake applications the axial clearance x is again built up until it reaches a pre-determined value at which the tooth 39a will snap over onto the next tooth flank 38c thus repeating the brake adjustment on the next brake disengagement.

As previously indicated the pawl 39 is of a bi-metallic construction and when the pawl reaches a temperature of typically 80° C. it is deflected (as shown in FIG. 7) to disengage the teeth 38 thus disabling the brake adjuster function and preventing over adjustment at high brake temperatures. The 80° C. pre-determined temperature of bi-metallic pawl 39 corresponds to a drum temperature of approximately 180° C.

Thus, not only does the pawl 39 provide via the teeth 38 the connection between the end portion 30 and the intermediate portion 32 for brake adjustment but it also provides the means for disabling the brake adjuster at high brake drum temperatures.

The invention has been described above with adjustment of the effective length of strut 16 taking place during a subsequent brake disengagement following the pawl 39 engaging behind the next tooth 38. The strut could equally well be arranged to adjust its effective length during a subsequent brake application by providing a hook on the end of pawl 39 and arranging pawl 39 to slide up and down teeth 38 when the brake is disengaged and to pull the teeth 38 with the hook when the brake is applied on the next brake application after the tooth has dropped onto the next tooth as a result of shoe wear.

The invention has also been described with end portion 31 having an external threaded portion 33 which engages with an internal threaded bore 34 in the intermediate member. However, any suitable threaded engagement could be used. For example the arrangement could be reversed with the intermediate member having an external threaded portion engaging with an internal threaded bore formed in the end portion 31. Similarly, it is not essential to the invention that end portion 30 slides within a bore 35 in the other end of the intermediate portion and other suitable arrangements could be used. For example the intermediate portion could slide within a bore formed in the end portion 30 with a compression spring housed in the bore acting between an end wall of the bore and an end of the intermediate portion.

What is claimed is:

1. A brake adjuster for a drum brake arranged to be located either between a pair of brake shoes or between a brake shoe and a handbrake lever associated with the other shoe, the adjuster comprising a variable length strut having first and second end portions and an intermediate portion therebetween in screw threaded engagement with said first end portion to vary the effective length of the strut, said second end portion being connected with said intermediate portion by a pawl and ratchet device comprising ratchet teeth arranged on one of said intermediate portion or said second end portion and the pawl on the other of said intermediate portion or said second portion, the pawl and ratchet device being arranged so that as the second end portion moves in an axial direction relative to the intermediate portion during a brake application, or alternatively during a brake disengagement, the pawl is moved axially to ride up a ratchet tooth and if the axial movement of said second end portion relative to said intermediate portion exceeds a pre-determined amount engages behind said tooth, so that when said second end portion moves in the opposite axial direction relative to said intermediate portion during a subsequent brake disengagement or brake application said intermediate portion is rotated relative to said first end portion to increase the effective length of the strut.

2. An adjuster according to claim 1 in which the pawl is bi-metallic and disengages the ratchet teeth if the temperature of the adjuster rises above a predetermined level to prevent adjustment of the effective length of the strut.

3. An adjuster according to claim 1 in which said first end portion is in screw threaded engagement with a first axial end of the intermediate portion and the said second end portion is in sliding engagement with the other axial end of the intermediate portion.

4. An adjuster according to claim 1 in which said second end portion extends into a bore in the intermediate portion which houses a spring which biases the end portions apart and maintains the end portions in contact with the associated shoes or lever.

5. An adjuster according to claim 1 in which end portions may be forked for easy engagement with the shoes or lever.

6. An adjuster according to claim 1 in which the ratchet teeth extend circumferentially around the intermediate member with the pitch and angle of the teeth determining the shoe travel before adjustment takes place.

7. An adjuster according to claim 6 in which the ratchet teeth are inclined at an angle to the longitudinal axis of the strut.

8. An adjuster according to claim 7 in which the pawl comprises a pawl tooth portion which extends generally parallel to the angle of inclination of the ratchet teeth.

* * * * *